Feb. 21, 1956    O. P. REED    2,735,306
TORQUE INCREASING MEANS
Filed Oct. 16, 1951    2 Sheets-Sheet 2
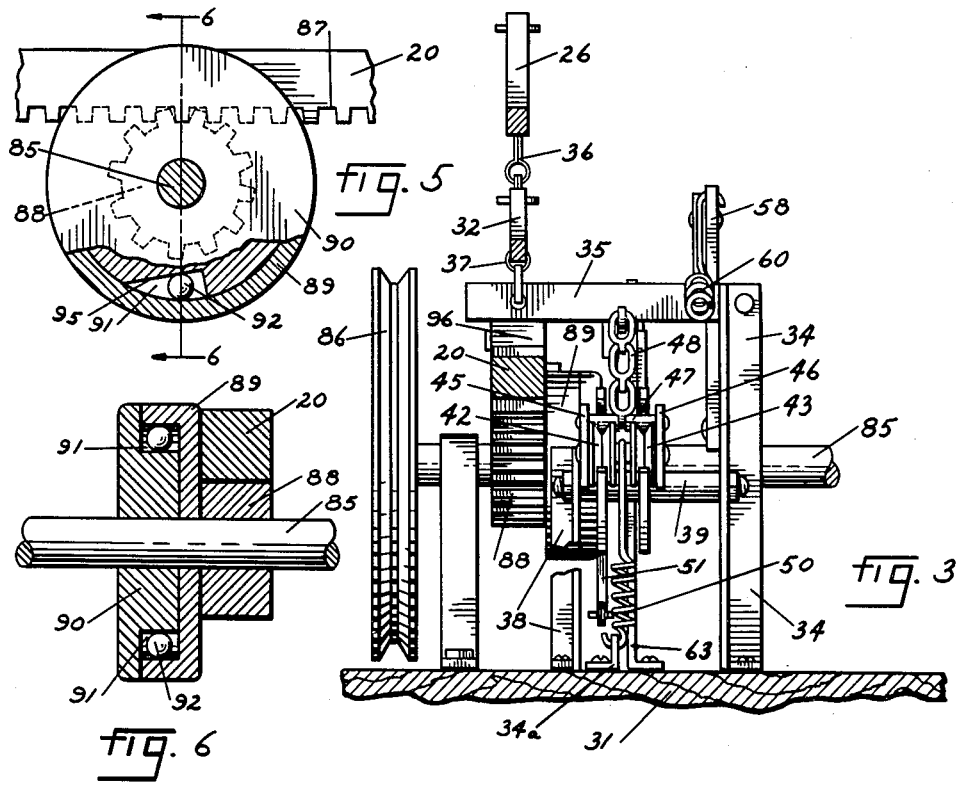
INVENTOR,
OTIS P. REED,
By Herbert Q. Minturn,
ATTORNEY.

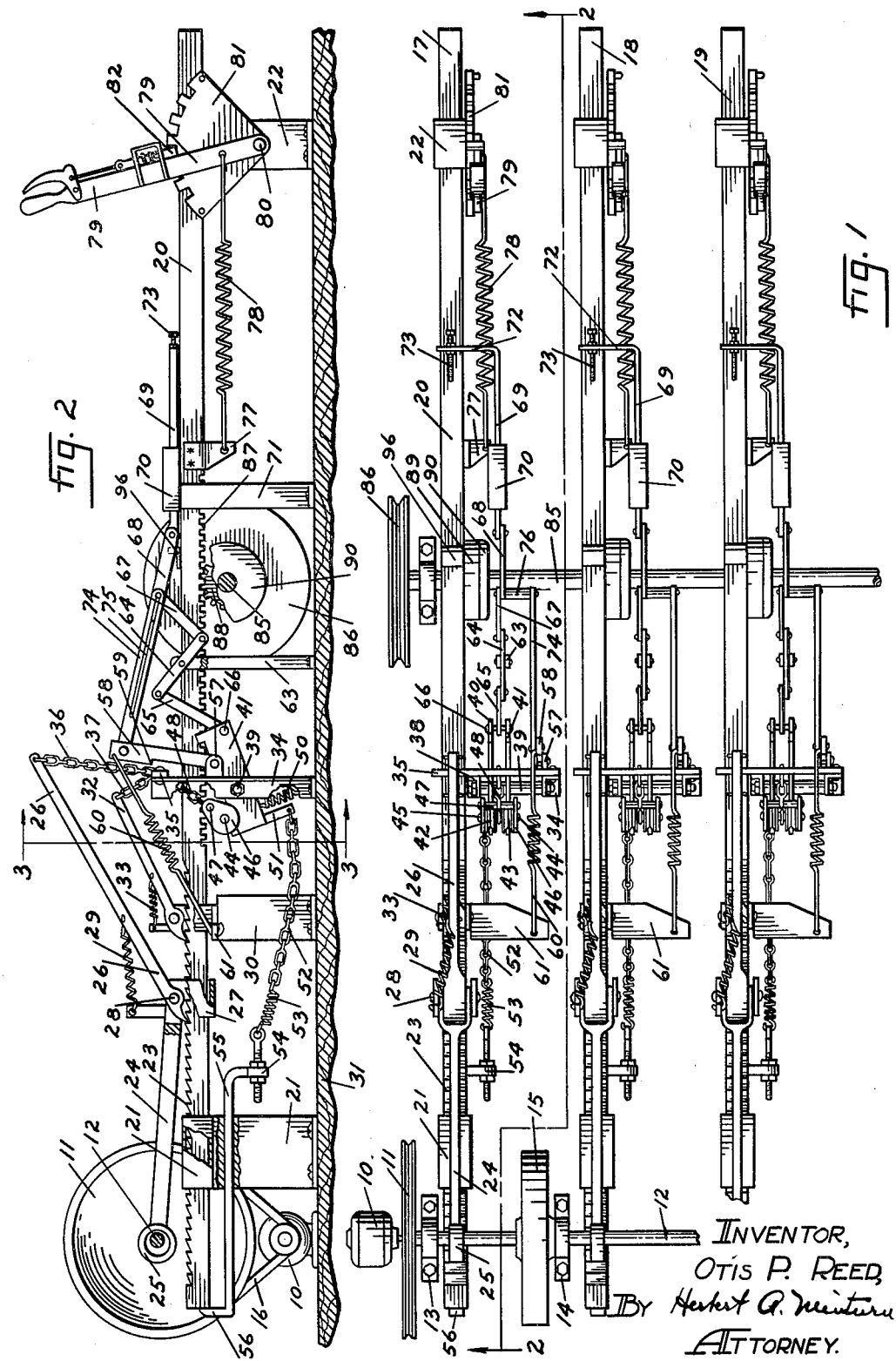

United States Patent Office 2,735,306
Patented Feb. 21, 1956

2,735,306

TORQUE INCREASING MEANS

Otis Pendergast Reed, Brazil, Ind.

Application October 16, 1951, Serial No. 251,590

1 Claim. (Cl. 74—120)

This invention relates to a mechanism whereby through reciprocating action there is produced from a rotary power source a high degree of torque increased beyond that of the original power unit, that is the power input unit. The device may embody a multiple number of stages or units coupled together through a common drive shaft operating to drive a common driven shaft.

The invention further relates to a structure for storing up output energy of an electric motor in a spring, and after a predetermined degree of storage of that energy, releasing the spring of its stored energy to drive an output shaft. The invention involves the actuating mechanism to accomplish that purpose wherein there is a complete, full release of an element which has been driven by the motor to increase tension in the spring, a holding of the driven member free from any resistance during travel of that member under the influence of the spring; and an automatic interconnection of that spring actuating member to the source of energy input all without the intervention of any outside source of energy other than the original driving member such as an electric motor, in the absence of any external energy sources such as electrical energy or battery supply. In other words the system is completely controlled by the original input source of energy such as an electric motor.

In describing the invention, reference is made to the accompanying drawings, in which:

Fig. 1 is a view in top plan of a multiple unit device embodying the invention;

Fig. 2 is a view in vertical elevation and section on the line 2—2 in Fig. 1;

Fig. 3 is a view in section on the line 3—3 in Fig. 2;

Fig. 4 is a view in detail in vertical elevation of the reversing control of the reciprocating member;

Fig. 5 is a view in elevation and partial section of an overrunning clutch; and

Fig. 6 is a view in section on the line 6—6 in Fig. 5.

An electric motor 10 is provided to drive a pulley 11 mounted upon a shaft 12 extending through bearings 13 and 14. On the shaft 12, there is fixed preferably a fly wheel 15 as a means of inertia to carry the shaft 12 as will hereafter be explained. The motor 10 as herein illustrated in the drawings drives the pulley 11 by means of a belt 16.

A plurality of drive bars operating in several units designated generally by the numerals 17, 18, and 19, as illustrated in Fig. 1, are each identical in construction and operation, and therefore one particular construction and operation of the unit 17 is sufficient to describe all of the units 17, 18, and 19.

A bar of the unit 17, hereinafter designated by the numeral 20, is preferably made square in cross section and is slidably carried through standards 21 and 22 respectively, so that the bar 20 is confined to longitudinal travel both fore and aft in reference to the drive shaft 12 extending transversely across the bar 20.

The bar 20 is provided with a left hand set of teeth 23 along the upper side of the bar 20. A connecting rod 24 has one end 25 eccentrically fitted about the shaft 12 so that when the pulley 11 revolves, the connecting rod 24 is reciprocated over the bar 20. The right hand end of the connecting rod 24 is bifurcated to straddle the lower end of a pawl 26 which is rockably carried between the rear ends of the connecting rod 24 so as to rock into and out of engagement with the teeth 23. A bracket 27 surrounds the bar 20, Fig. 2, from the under side and sides thereof, to have the pin 28 pass through the bracket 27 above the bar 20, through the ends of the connecting rod 24, and through the pawl 26. A spring 29 has one end fixed to an upper extension of the bracket 27, and the other end to the pawl 26 so that the pawl is normally urged through the spring 29 into engagement with the teeth 23 on the bar 20. Therefore as the connecting rod 24 reciprocates, the pawl 26 will reciprocate likewise to tend to urge the bar 20 to the left.

The bracket 27 is located between the post 21 and a second post 30. The post 30 is fixed to the base member 31 as is also the post 21. The bar 20 extends over the top of the post 30, and this post 30 in turn rockably carries a second pawl 32 rockably to have the pawl engage with the teeth 23 in such manner that the bar 20 can move to the left, but the pawl 32 engaging with the teeth 23 will prevent the bar 20 from moving to the right. This engagement of the teeth 23 by the pawl 32 is normally induced by means of a spring 33 interconnecting with a portion of the post 30 above the bar 20 and the pawl 32.

A third post 34 is supported by the base 31 to extend upwardly back of the post 30 and to one side of the bar 20. Pivoted to this post 34 is a lever 35 swinging across the bar 20. Outer ends of the dogs 26 and 32 are interconnected with the lever 35 at its free end removed from the post 34 by means of chains 36 and 37 respectively.

A post 38 is positioned between the post 34 and the bar 20 and is tied to the post 34 by means of a transverse rod 39.

A rocker composed of two parallel and spaced apart plates 40 and 41 are rockably mounted on the transverse bar 39. On top of each of the plates 40 and 41 there is carried a roller 42 on the plate 40, that is on the top edge thereof, and a pulley 43 on the top edge of the plate 41. These two pulleys 42 and 43, are tied together on an axle 44 through side plates 45 and 46 respectively. A bar 47 interconnects the upper ends of the side plates 45 and 46, and carries a chain 48 which is connected to the lever 35. A spring 50 interconnects the axle 44 between the pulleys 42 and 43 by one end, by the other end is secured to a lower post 34a, vertically under the bar 39.

An arm 51 extends downwardly from the left hand end of the plate 45, and has a chain 52 connected to the lower end of that arm 51 to extend toward the left to a spring 53 in turn connected with a leg 54 which extends laterally from a bar 55 which is slidingly carried by the post 21 below the bar 20, the bar 55 extending beyond the post 21 to have a leg 56 turned upwardly into the path of the end of the bar 20, Fig. 2.

The post 34 has a bracket 57 rockably carrying an arm 58 which extends upwardly and which carries a tooth 59 normally extending over the top of the lever 35 as a means of preventing lifting of the lever 35. A spring 60 interconnects the upper end of the arm 58 above the notch 59 with a bracket 61 which is carried to extend laterally from the post 30.

A post 63 is carried by the base 31 and spaced to the right of the post 34. On the upper end of this post 63 there is rockably mounted a lever 64 to rockably interconnect at its left end with a connecting bar 65 in turn rockably connected with the right hand end of the two plates 40 and 41 by means of a transverse pin 66.

A connecting bar 67 pivotally interconnects with the right hand end of the lever 64 by one end and by the other end extends upwardly to connect with a connecting rod 68 which in turn rockably interconnects with a slide bar 69 slidably carried by a guide 70 mounted on the upper end of the vertical post 71 in turn mounted on the base 31. This connecting bar 69 has a foot 72 extending transversely across the upper side of the bar 20 and carries an adjustable set screw 73 parallel to and above the bar 20. A blade 74 carrying a longitudinal slot 75 has one end pivotally interconnecting with the upper end of the arm 58 and the connecting pin 76 which rockably interconnects the connecting link 67 and the connecting bar 68.

A bracket 77 fixed to the bar 20 extends downwardly therefrom to have a spring 78 secured by one end thereto, and by its other end to a lever 79 which is mounted on a pin 80 to swing around a toothed bracket 81 whereby the lever 79 may be shifted to the right and secured by the tooth 82 engaging the bracket 81 at various positions in order to vary the tension of the spring 78 in tending to pull the bar 20 to the right.

Between the posts 63 and 71, there is mounted a transverse driven shaft 85 extending across under the bar 20. On one end of this shaft 85 there is fixed a driving pulley 86. The right hand end of the bar 20, that is the under side of the bar 20 appearing at least between the posts 30 and 22, is provided with a plurality of teeth 87 which are in constant mesh with a pinion gear 88. This pinion gear 88 is fixed to a clutch member 89 which is revolubly carried on the shaft 85. Fixed to the shaft 85 is a second clutch member 90 which telescopes within the member 89, and carries a plurality of notches 91 therearound, into which notches there are carried a ball bearing 92 in each instance. When the bar 20 travels to the left, it will revolve the clutch member 89 in a counterclockwise direction so as to tend to carry the ball bearings 92 loosely between the member 90 and the member 89 and therefore not tend to drive the member 90 and the shaft 85 fixed thereto.

Operation

In setting the device into operation, the lever 79 is initially rocked to the right to permit the latch pin 82 to drop into engagement with the sector member 81 at the desired position which will produce the desired tension on the spring 78. Fundamentally, the motor 10 stores up energy in the spring 78 for a definite period of operation of the motor. This will become evident in the following description.

With the lever 79 adjusted as just indicated, the bar 20 is initially in some such position as shown in the drawings, Figs. 1 and 2, the bar 20 being held against travel to the right under pull of the spring 78 by engagement of the dog or pawl 32 with a tooth 23 on the top side of the bar 20.

Then the motor 10 is set into operation to reciprocate the eccentric rod 24 which will reciprocate the dog 26 back and forth across the top side of the bar 20, the dog 26 dropping into engagement with the teeth 23 as the rod 24 is pulled to the left, and riding back over the tops of the teeth when the rod 24 shifts the dog 26 to the right. Thus as between the two dogs or pawls 26 and 32, the bar 20 is progressively advanced to the left under the increasing tension of the spring 28.

In this travel of the bar 20, under the operations of the dogs 32 and 26, the chains 36 and 37 have slack in them permitting these two dogs to rock to secure their proper engagement and disengagement with the teeth 23 as is required. This slack in the chains 36 and 37 is permitted by reason of the fact that the lever 35 is free to be lifted under the influence of the springs 29 and 33 since the lever member 58 is disengaged from the cross lever 35 at that time.

The lever member 58 is maintained in that rocked position as indicated in Fig. 2 free from engagement with the cross lever 35 by reason of the fact that the plates 41 and 42 are rocked as indicated in Fig. 2 to have their right hand ends elevated above their left hand ends. This means that the connecting link member 65 has been kicked upwardly to in turn rock the lever 64 on the post 63 and position the second connecting link 67 in such a manner that the member 64 is held in a rearwardly directed position to maintain that lever member 58 in the released position.

In accordance with previous adjustment as to the length of the chain 52, that is the effective length, the left hand end of the bar 20 will come into contact eventually with the upturned arm 56 of the slide bar 55, tending to carry the bar 55 along therewith until the chain 52 is pulled up tautly and yieldingly under the influence of the spring 53, until finally the plates 41 and 42 are rocked to elevate their left hand ends and drop their right hand ends, with the result that the rollers 43 and 42 shift from their left hand positions, Fig. 4, to the right hand positions where the assemblies are indicated in dash lines. The tension spring 50 causes the tilting of these plates 41 and 42 to take place with a snap action, so that the travel of the rollers from one end to the other is quickly effected. It is to be noted that the right hand lengths of the plates 41 and 42 from their pivot axle 39 are longer than are the left hand ends so that the rollers 42 and 43 will have dropped to lower positions in their right hand positions than they were in the left hand positions. This means that the chain 48 will pull the lever 35 downwardly to in turn pull down on the arms 32 and 26 of the dogs so as to release both of them from engagement with the teeth 23.

This means that the bar 20 is then entirely under the influence of the spring 78 tending to pull the bar 20 quickly to the right.

Now in the right hand travel of the bar 20, the teeth 87 revolve the pinion gear 88 to cause the clutch member 89 to revolve in a clockwise direction, Figs. 5 and 6, and thus tend to carry the balls 92 into wedging engagement between the clutch member 89 and the sloping face 95 of each notch 91 to effect mechanical wedging action between the clutch member 89 and the clutch member 90 through the ball 92 in each instance so as to drive the clutch member 90 and thus in turn drive the shaft 85 and its power take off pulley 86.

This return action of the bar 20 under the influence of the spring 78 will continue to take place in the present mechanism until an abutment 96 herein shown as being secured on the top side of the bar 20 will strike the adjusting screw 73 which is carried on the arm 72 of the slide bar 69.

Going back for an instant to the position of the plates 41 and 42 when they are rocked to the dash line positions, Fig. 4, it will be noted that as shown by the dash lines, the various members 65, 64, 67, and 75 will have been rocked accordingly to those dash lines, to in turn allow the lever member 58 to come into engagement by the notch 59 over the lever 35. Now when the abutment 96 comes back and strikes the adjusting screw 73, the slide member 69 is pulled to the right, and this overcomes the pull of the spring 60 to pull to the right the member 74 and also at the same time rock the members 67, 64, 65, to the full line positions which causes the plates 41 and 42 to be lifted by their right hand ends and dropped by their lower left hand ends, and in turn pull the pulleys 42 and 43 to the left hand positions, all as indicated in Fig. 4 in the full line positions. Thus when the bar 20 has traveled sufficiently to the right, the abutment 96 releases the notch 59 of the member 58 to permit the cross lever 35 to travel upwardly since the chain 48 is then in a loosened condition, and the two dogs 26 and 32 are again free to engage the teeth 23 of the bar 20, the dog 32 arresting further travel of the bar 20 to the right against the pull of the spring 78.

Then as the motor 10 continues to revolve the pulley 11 and the shaft 12, the eccentric rod 29 again reciprocates the dog 26 over the teeth 23 to return the bar 20 progressively to the left to repeat the operations again as have been described.

Now the same operations exactly take place in reference to the bar assemblies 18 and 19, Fig. 1, the exception being that the eccentric rods 24 are so interconnected with the shaft 12 that they do not reciprocate in the same timed sequence as does the rod 24 in conjunction with the bar 20, but are spaced in their settings around the shaft 12 so that there is an overlapping of the actions in that, for example, when the bar 20 is traveling to the right under the influence of the spring 78, the next bar 18 may still be progressively being pulled to the left, and then the bar 19 is just ready to be released for its right hand travel at the end of the right hand travel of the bar 20. In this manner, a constant, or a fairly constant torque may be kept on the driving shaft 85. The inertia of the fly wheel 16 on the shaft 12 tends to overcome the otherwise tendency to reduce or vary the speed of the shaft 12 as the various springs 78 are brought to full tension and released.

In reference further to the action of the lever member 58 and the cross lever 35, this lever 58 springs back against the lever 35 to bring the notch 59 over the lever 35 before the lever 35 can be released by the chain 48 during the travel of the rollers 42 and 43 from the right to the left hand ends of the plates 41 and 42. In other words, the engagement between the member 58 and the member 35 becomes effective prior to the travel of the rollers from the right to the left hand ends so the engagement may be made before the lever 35 is allowed to travel upwardly. This upward tendency to travel, it will be remembered, is due to the pull of the springs 29 and 33 through the dogs 26 and 32 and their chains 36 and 37 interconnecting with the lever 35.

Therefore, while I have described my invention in the one particular form, it is quite obvious that many structural changes may be embodied in the actual construction without departing from the spirit of the invention, and I therefore do not desire to be limited to that precise form beyond the limitations which may be imposed by the following claim.

I claim:

The combination of a motor; a rack bar; a pawl reciprocated by said motor over teeth on the bar advancing the bar in one direction; a spring resisting said advancement; a hold pawl engaging said rack teeth and retaining the bar in advanced positions against the resistance of said spring; both of said pawls being yieldingly biased toward said bar teeth; a pawl lift member; lost motion means interconnecting both of said pawls with said lift member; means latching said lift member in a position holding said pawls from the path of said teeth; latching means actuating mechanism comprising a snap-action past-center rocker; a shiftable connection between said rocker and said lift member, a lost motion connection with said rack bar and said rocker shifting the rocker to move said lift member through said connection into said pawl holding position upon predetermined advancement of said bar releasing the bar to reverse travel under pull of said spring, a latch bar rockably biased toward said lift member, a lever system connected with said rocker and holding said latch bar away from said lift member during said bar advancement, said lever system being actuated by said rocker shifting to place the latch member in engagement with said lift member and thereby maintain the pawls out of the path of the bar teeth during said bar reverse travel, and an abutment on said bar shifting said leverage system upon predetermined reverse bar travel moving said latch bar out of lifting member engagement and simultaneously returning said rocker to its initial position and releasing said lift member allowing said pawls to return to bar tooth contact; and an output shaft driven by said bar reverse travel.

References Cited in the file of this patent

UNITED STATES PATENTS

| | | |
|---|---|---|
| 166,964 | Brown, Jr. | Aug. 24, 1875 |
| 425,571 | Hargrove | Apr. 15, 1890 |
| 889,677 | Harris | June 2, 1908 |
| 1,215,242 | Bopp | Feb. 6, 1917 |
| 1,555,067 | Metcalf | Sept. 29, 1925 |
| 1,677,835 | Linderman | July 17, 1928 |
| 1,766,364 | Waller | June 24, 1930 |
| 2,498,914 | Correll | Feb. 28, 1950 |

FOREIGN PATENTS

| | | |
|---|---|---|
| 236,952 | Germany | July 14, 1911 |
| 459,178 | Italy | Aug. 25, 1950 |